(12) United States Patent
Rex

(10) Patent No.: US 6,308,160 B1
(45) Date of Patent: Oct. 23, 2001

(54) SYSTEM AND METHOD FOR INTEGRATING OPERATION OF AN INDOOR GOLF FACILITY INTO OPERATION OF AN AIRPORT CONCOURSE

(75) Inventor: Diane H. Rex, Lafayette, CO (US)

(73) Assignee: Rex Entertainment, Inc., Lafayette, CO (US)

( * ) Notice: Subject to any disclaimer, the term of this patent is extended or adjusted under 35 U.S.C. 154(b) by 0 days.

(21) Appl. No.: 09/437,610

(22) Filed: Nov. 10, 1999

(51) Int. Cl.[7] .................................................. G06F 153/02
(52) U.S. Cl. ...................................... 705/6; 705/5
(58) Field of Search ................... 705/1, 5, 6, 14, 705/26, 27; 707/10, 100–104

(56) References Cited

U.S. PATENT DOCUMENTS

| | | |
|---|---|---|
| 4,922,439 * | 5/1990 | Greenbalt . |
| 5,732,398 * | 3/1998 | Tagawa . |
| 5,797,127 | 8/1998 | Walker et al. ............ 705/5 |
| 5,832,453 | 11/1998 | O'Brien .................. 705/6 |
| 5,884,277 | 3/1999 | Khosla ................... 705/14 |
| 5,897,620 | 4/1999 | Walker et al. ............ 705/5 |
| 5,924,075 * | 7/1999 | Kanemitsu . |
| 5,926,798 * | 7/1999 | Carter . |
| 5,933,098 | 8/1999 | Haxton ................. 340/945 |
| 5,948,040 * | 9/1999 | DeLorme et al. . |

FOREIGN PATENT DOCUMENTS

WO 89/07798 * 8/1989 (WO) .

OTHER PUBLICATIONS

"Challenge and Trimph", Travel Agent, p34, Dialog file 16, Accession No. 03153731, Dec. 20, 1993.*
"New Otani Adds to Japan Convention Complex", Business Travel News, p 30, Dialog file 16, Accession No. 03114099, Nov. 22, 1993.*

* cited by examiner

Primary Examiner—Frantzy Poinvil
(74) Attorney, Agent, or Firm—Kent A. Lembke; Hogan & Hartson, L.L.P.

(57) ABSTRACT

A method and system for operating and integrating an indoor golf facility in the operations of airport terminals, airlines, and goods and service providers. An integrated management system is provided that includes a remote host computer communicatively linked to a local host computer of an included indoor golf facility. The indoor golf facility provides travelers access to golf simulators, golf practice greens, and golf lessons with golf professionals working at the golf facility. The remote host computer functions in part as central reservations system and is linked to travel agents and individual travelers who can make reservations for golf lessons and/or golf simulators at any of a number of golf facilities to suit their travel itinerary. Integration with goods and service providers is provided with links between the remote host, destination golf courses, hotels, and golf equipment manufacturers and retailers that allow a traveler to make reservations with the service providers and to place purchase orders with the goods providers. Upon check-in at the golf facility, the traveler is provided with a personal receiver, and the local host computer monitors flight information by accessing airlines' flight scheduling databases. The local host computer automatically informs the traveler via the personal receiver of their upcoming flight and of any pertinent changes in their travel itinerary.

27 Claims, 3 Drawing Sheets

SYSTEM AND METHOD FOR INTEGRATING OPERATION OF AN INDOOR GOLF FACILITY INTO OPERATION OF AN AIRPORT CONCOURSE

BACKGROUND OF THE INVENTION

1. Field of the Invention

The present invention relates generally to a system and method for integrating an indoor golf center or facility within a traditional, existing airport terminal building, and more particularly, to a computer method and system for linking the operation of an indoor golf facility, at which travelers can participate in golf activities, to the operations of an airport terminal and to the operations of numerous service and equipment providers including airlines, travel agents, golf equipment retailers and manufacturers, hotels, and golf courses.

2. Description of the Related Art

While air travel is a significant method of transportation that is continuing to grow in its importance, many travelers are deeply dissatisfied with their air travel experience. A large part of this traveler dissatisfaction is caused by long layovers and waiting periods at airport terminals resulting from scheduling patterns of flights by airlines and unplanned flight delays due to mechanical difficulty, weather, and other unforeseen problems. The long layovers and waiting periods are seen by travelers as a waste of time and an inconvenience because the length of time they spend at the airport terminals is generally outside their control and because there is typically only a very limited number of things to do within the airport terminal to make the wait more bearable. Typical activities include eating and drinking, shopping, resting, and reading in lounges, restaurants, shops, and waiting areas provided inside the airport terminal and to enjoy some of these limited facilities, travelers often are required to join (i.e., pay an extra fee) travel clubs organized and operated by individual airlines. Additionally, if a traveler does participate in any of these activities that generally occur at a large distance from airline boarding gates, they have trouble enjoying the activity because they remain solely responsible for monitoring the departure and/or boarding time of their flight, which can be changed by the airline at any time, and for arriving in a timely fashion at the correct boarding gate, which can also be changed by the airline, to insure they do not miss their flight. Because travelers tend to hold the airport terminal operator and, more often, the airline they are traveling with responsible for their travel experience, including experiences during layovers and waiting periods, airport operators and airlines are continuously looking for ways to improve traveler satisfaction during layovers and waiting periods to increase repeat and referral business. The inventor recognize that the game of golf and activities associated with golf could be popular and well-accepted in airport terminal or concourses and would significantly enhance many air travelers' satisfaction with the overall travel experience. Golf is a well-known and popular game that is enjoyed by a large number of players belonging to a wide range of age groups of either gender. In traditional, outdoor golf, players begin play on a golf course at a tee time established days, weeks, or longer beforehand and are grouped together in a foursome of players to play a 9 or a 18-hole round or game of golf. Alternatively, a player may put their name on a waiting list and be added to a group of golfers to create a foursome. In either case, play is generally continued until all (i.e., 9 or 18) of the holes are completed by all four players. Before and after the round of golf at the golf course, the players can practice their game at provided putting greens, chipping greens, and driving ranges, can take lessons from a golf professional, and can purchase and test various golf equipment and accessories. From the player's perspective, these and similar golf and golf-related activities are attractive alternatives to the limited number of entertainment activities provided in airport terminals prior to this invention.

However, in addition to being attractive from the player's viewpoint and increasing traveler satisfaction, a golf and golf-related facility will only be widely accepted and adopted by air travelers, airport operators, airlines, and the facility operator if other constraints are satisfied. One important constraint is that such activities are commercially viable, e.g., draw in large numbers of players who will pay to participate or otherwise spend money in and around the golf facility to exceed operation costs of the facility operator and be as, or more, profitable to the airport operator than existing facilities within the airport terminal, such as a lounge or restaurant, that may have to be replaced. An additional constraint is the need to adequately integrate the operation of the golf facility into the operation of the airport terminal and of the airlines operating at the terminal such that travelers will not miss flights and operations of the airport terminal will not be hindered. If these constraints can be overcome, there will be a demand among airport terminal operators and airlines for such a system that allows golf and golf activities to be brought into the airport setting.

Presently, there is no system or apparatus that addresses the problems associated with bringing the traditional game of golf into airport facilities. Consequently, there remains a need for a method and system for operating a golf facility within an airport setting that is attractive to potential players because of its familiarity and its adaptability for player participation; that is appealing to airport terminal operators and golf facility operators because it attracts numerous customers (i.e., players), is commercially viable, and integrates well with other airport and airline operations.

SUMMARY OF THE INVENTION

To address the above discussed needs (e.g., traveler satisfaction) and constraints (e.g., scheduling, communication, and profitability), the system and method of the present invention provides an airport golf facility management system including an indoor golf center or facility located in an airport terminal and a remotely-located, host computer. The management system is configured to fully integrate (i.e., communicatively-link in a seamless fashion to exchange scheduling, goods, and services information) the indoor golf center with airport and airline operations and with numerous goods and services providers. In general, the indoor golf center includes numerous golf-related facilities to provide a well-rounded entertainment facility for travelers who are interested in golf. The management system includes the remote host computer center to function as a central reservation system providing a communications link (via standard telephone service or online communications through the Worldwide Web portion of the Internet) between service providers, such as travel agents, golf equipment manufacturers and retailers, hotels, and the like, and the airlines and indoor golf facility. In one mode of operation, the remote host computer center is provided a travel itinerary of a traveler interested in participating in golf activities. The remote host computer center then contacts a local host computer system included in the indoor golf center and schedules an appointment for playing golf (i.e., a tee time) or for other provided facilities that fits the travel itinerary of the traveler. The appointment or tee time is documented (e.g., similar to hotel reservations) on the traveler's itinerary documents received from the travel agent, and such documentation may include a verification code to assist in verification of the traveler's appointment. When the traveler arrives at the airport terminal, the traveler simply checks in at the indoor golf center and participates in activities while the local host computer system continuously monitors their travel itinerary and airline schedules so as to provide notification to the traveler when they need to leave the indoor golf center to check-in and/or board their airplane. With the basic operation of the indoor golf center of the present invention understood, a discussion is now provided of some of the important aspects of the invention that make the indoor golf center attractive to travelers (i.e., players) and to airport and airline operators while also providing a sound economic basis for operating the indoor golf center.

From the traveler's perspective, the integrated management system includes a number of features that make use of the invention appealing. First, the indoor golf center provides numerous activities that increase the traveler's satisfaction with layovers at an airport terminal by bringing the experience of an outdoor golf course into an airport terminal or concourse. These activities can include testing new golf equipment, training with a golf professional, practicing on a chipping green and/or a putting green, playing golf on a golf simulator (i.e., a computerized, multimedia simulation of numerous existing golf courses that allows a player to make full swings and tracks ball travel and the like), and relaxing in a golf-theme lounge. The remote host can include a client database or information storage system to track each player's use of the various facilities to provide the client with information pertaining to their golf game (e.g., lessons taken, professionals used, courses played, and scores obtained).

Second, the operation of the indoor golf center is seamlessly integrated into the operation of the airline and airport so that from the traveler's perspective all of the services appear to originate from a single source. This is accomplished, at least in part, by the management system by communicatively linking the travel agent and the airlines with the indoor golf center, thereby enabling the traveler to make a single call to a travel agent who can set up a complete itinerary that includes reservations or tee times at the indoor golf center that neatly fit within the airline flight schedules. Adding to the sense of seamless integration, the airport terminal operator provides lockers near to the indoor golf facility for the traveler to securely store luggage, coats, and other items. When the traveler checks-in at the indoor golf center, the traveler provides their airline and flight number information, which is input into a monitoring database or data storage of the local host. The traveler is then requested to specify when, relative to their flight departure time, they would like to be notified or paged. The traveler is given a personal receiving device or pager, and the local host uses a transmitter to send a signal to their personal receiver at the preset time prior to their departure time, thereby providing a unique notification service that obviates the need for the traveler to repeatedly check flight departure times and the current time. Further, the local host can be linked to the airline scheduling database and/or to the airport scheduling information system to allow the local host to monitor changes in flight data such as flight departure time, cancellations, and departure gates. This ongoing monitoring allows the local host to pass this information onto the traveler via the personal receiver (which can include a display screen for text messages) and/or to automatically change the time for notification, e.g., if the departure time is delayed one hour, the notification time would be changed to one hour later. The combination of an indoor golf center that provides many of the features of an outdoor golf course and of seamless integration into the operation of the airline and airport terminal makes the integrated management system attractive to golf-enthusiast travelers.

According to another aspect of the invention, the management system for operating the indoor golf center within an airport terminal is configured to integrate operation of the indoor golf center with numerous goods and service providers. This integration of goods and service providers is desirable to provide "one-stop shopping" for the traveler and to provide competitive advantages to the goods and services providers through mutually beneficial alliances. Such integration also enables the goods and services providers to improve marketing effectiveness with directed marketing because access to the traveler information in the client database includes only travelers with known interests (e.g., golf players, travel characteristics, golf equipment preferences, hotel preferences, and the like). To provide integration of operations, the management system includes the remote host that is directly linked with the local host of the indoor golf center. The remote host is further communicatively linked with the goods and service providers that can include hotels, golf equipment manufacturers and retailers, and destination golf courses. During operation, the traveler can contact a travel agent (or the remote host directly via a Web site or other methods) to arrange a reservation at the indoor golf center. The travel agent at this time can provide the traveler with possible packages with the goods and services providers, such as tee times at destination golf courses, special packages at area hotels (with or without associated golf courses), and current offers from golf equipment manufacturers and retailers. Further, when the traveler is at the indoor golf center, the traveler can again be contacted, directly and/or through the local host, by the goods and services providers in an attempt to concentrate their marketing efforts (e.g., a traveler may try a particular brand of golf club at the indoor golf center and the manufacturer may provide sales information regarding the clubs). This integration is also attractive from the traveler's perspective because, among other things, the traveler can book tee times at outdoor golf courses at their travel destination that are linked or allied with the indoor golf center.

From the airline operator's and airport terminal operator's perspectives (as well as the indoor golf center operator's perspective), the management system for operating the indoor golf center in an airline terminal is desirable because the game is useful as a marketing tool, is commercially viable, and is readily and securely operable within the existing airport facilities. As a marketing tool, the indoor golf centers are attractive because the airport terminal is providing desirable entertainment activities that can make the terminal enjoyable for travelers and for others that are waiting for the travelers. The airlines can use the activities at the indoor golf center as rewards for traveling with their airline by allowing frequent flyer points to be accepted at the indoor golf center and by becoming exclusive sponsors or allies of such centers with only their advertisements being displayed at the indoor golf center. The indoor golf centers are commercially viable because the operators of such centers will receive income streams from numerous sources, including advertisers (e.g., advertising at the golf simulators, advertising on banners and the like at the indoor golf center, and advertising through the initial appointment booking via the travel agent or the associated Web site), travelers, and goods and service providers who may pay a commission for referral business. The indoor golf center can also be operated within existing facilities because the required space is relatively small and because communication links can be readily adapted to existing airport terminal communication and information systems.

Other features and advantages of the invention will become clear from the following detailed description and drawings of particular embodiments of the method and system for integrating operation of an indoor golf facility into the operations of an airport facility and its network of service providers.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention. In the Drawings

DETAILED DESCRIPTION OF THE INVENTION

In the following description, the invention is set forth in the context of a particular entertainment center, i.e., an indoor golf facility, being operated and integrated into the operations of an airport terminal. It will be appreciated that certain aspects of the present invention are applicable to other entertainment facilities not specifically discussed and, these other types of entertainment facilities are considered within the scope of this invention.

With the above summary in mind, it may now be helpful in fully understanding the inventive features of the present invention to provide in the following description a thorough and detailed discussion of a number of specific embodiments of the invention. Generally, as discussed above, the present invention provides a method and system for operating an indoor golf facility within an airport that overcomes problems with communicatively linking airlines, travel agents, travelers, and service providers and with monitoring flight schedules while participating in an entertainment activity at an airport terminal. Specifically, the following discussion emphasizes the features of the invention that provide a method and system for operating an indoor golf facility in an airport setting that is appealing to travelers (i.e., players) because it provides similar activities as outdoor golf, is attractive to airlines and airport terminal operators because of its marketing features (i.e., improves layover experiences and provides direct advertising opportunities) and its commercial viability, and is or can be linked with a number of goods and service providers. The discussion of the invention will progress from a description of the inventive features of the overall networked management system that provides for a uniquely integrated system to a discussion of the features of one embodiment of an indoor golf facility. This discussion is followed by a description of modes of operation of the integrated management system of the invention.

Figure 1:
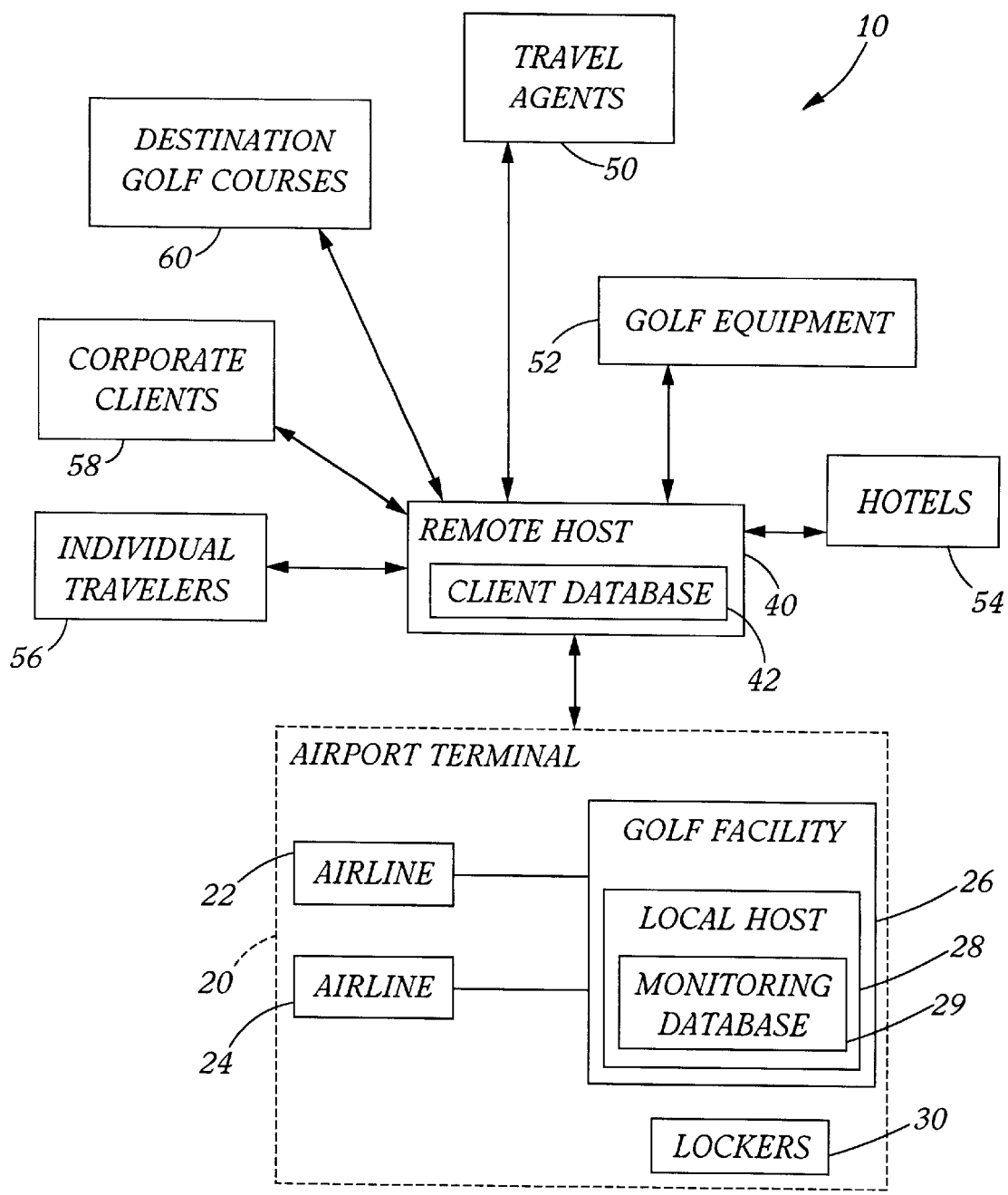
FIG. 1 is a functional block diagram of the operative components of an integrated operating system according to the present invention.

Referring to FIG. 1, an integrated management or operating system 10 is illustrated that provides a communication network between various goods and service providers and with airlines and airport terminals, all of which creates unique and beneficial alliances. To provide this communications network, the management system 10 includes a remote host 40 and an indoor golf facility 26 that are linked via the Internet, telephone service, or otherwise to provide ongoing exchanges of information. The remote host 40 can be a standard server device and/or can include a communications port, a central processing unit (CPU) with RAM and ROM and with a data storage device with a number of databases. Specifically, the remote host 40 illustrated includes a client database 42 for storing information (e.g., name, address, identification codes, golf information such as handicap, equipment preferences, and course use and preferences, and travel histories) pertaining to each traveler who uses the golf facility 26 of the present invention. To facilitate communication and data manipulation and storage, the golf facility 26 includes a local host 28 which may be a smaller capacity server device similar to the remote host 40 with a monitoring database 29 (which will be discussed in detail below) or simply be a computer terminal linked to another remote server (not shown).

As illustrated, the golf facility 26 is located within an airport terminal 20 with the local host 28 linked with airlines 22, 24 (which for ease of illustration are also shown located within the airport terminal 20 but for purposes of this invention, the airlines 22, 24 can have reservation systems with reservations and other databases physically located remote to the airport terminal 20) and with lockers 30 provided by the airport terminal 20 operator to allow storage of the traveler's luggage and personal items. Significantly, the communication link allows the local host 28 to monitor flight schedule information from the airlines 22, 24 which can be used to update the monitoring database 29. The monitoring database 29 can be used by the local host 28 to monitor flight information for a traveler who is using the golf facility 26. For example, the monitoring database 29 can include fields to identify the traveler, to identify the airline and particular flight which the traveler wishes monitored, the departure time of the flight, and the time for notifying or alerting the traveler to catch the flight (which is based on a "grace period" provided by the traveler, such as 30 minutes prior to departure time for a flight). The local host 28 can be operated to periodically or continuously monitor the airline schedules by accessing flight schedule databases to find the travelers flight information through the link with the airlines 22, 24. If the flight information changes (i.e., the flight is canceled, departure time is changed, or the departure gate is changed), the local host 28 can update the information in the monitoring database 29 and automatically or upon traveler request provide this new information to the traveler. For example, it may be desirable that the local host 28 automatically update the time for notifying the traveler so that the traveler is allowed to participate longer in activities at the golf facility 26 or is notified that they must leave earlier to avoid missing a flight.

The management system 10 provides a communication link with travel agents 50 to facilitate a traveler making tee times or training appointments with golf professionals at the golf facility 26. In this regard, the travel agent 50 is given a traveler's itinerary and then asks the traveler if they would be interested in golf-related activities during travel. If the traveler is interested, the travel agent 50 contacts the remote host 40 to determine if a golf facility 26 is located in any of the airport terminals 20 at which the traveler will have a relatively long (e.g., one or more hours) layover during their scheduled trip. If a golf facility 26 is located at such a layover terminal 20, the travel agent 50 can request a tee time for a golf simulator (discussed in more detail below) or an appointment for a golf lesson with a golf professional who gives lessons at that particular golf facility 26. Once a tee time or lesson appointment is made, it can be documented on the traveler's itinerary and the traveler can be provided by the local host 28 with a confirmation code to facilitate check-in at the golf facility 26.

Additionally, the remote host 40 is linked with destination golf courses 60 and hotels 54 such that the travel agent 50 can make reservations at hotels 54 which are linked to the management system 10 and can make tee times and appointments at golf courses 60 in destination locations of the traveler. Alternatively, the remote host 40 can be linked to individual travelers 56 via the Internet or by telephone such that the individual travelers 56 can contact the golf facility 26 without the assistance of a travel agent 50 to make tee times and reservations. This access may be simplified by the provision of a Web site provided by the remote host 40 that provides access to a number of golf facilities 26 and to services and goods providers such as destination golf courses 60 and golf equipment manufacturers and retailers 52. The Web site can also be designed to allow the individual golfers 56 to access the client database 42 and access their golf-related information (e.g., their handicap, which courses on simulators they have played, or current ratings/analyses provided by training equipment). Similarly, the remote host 40 can be linked to corporate clients 58 to allow corporations to make reservations at the golf facility 26 when making travel arrangements for its employees and officers. The remote host 40 can also be linked to golf equipment manufacturers and retailers 52 to allow these companies 52 to advertise on the management system 10 Web site and to provide promotional and technical information to travelers when they are at the golf facility 26.

Figure 2:
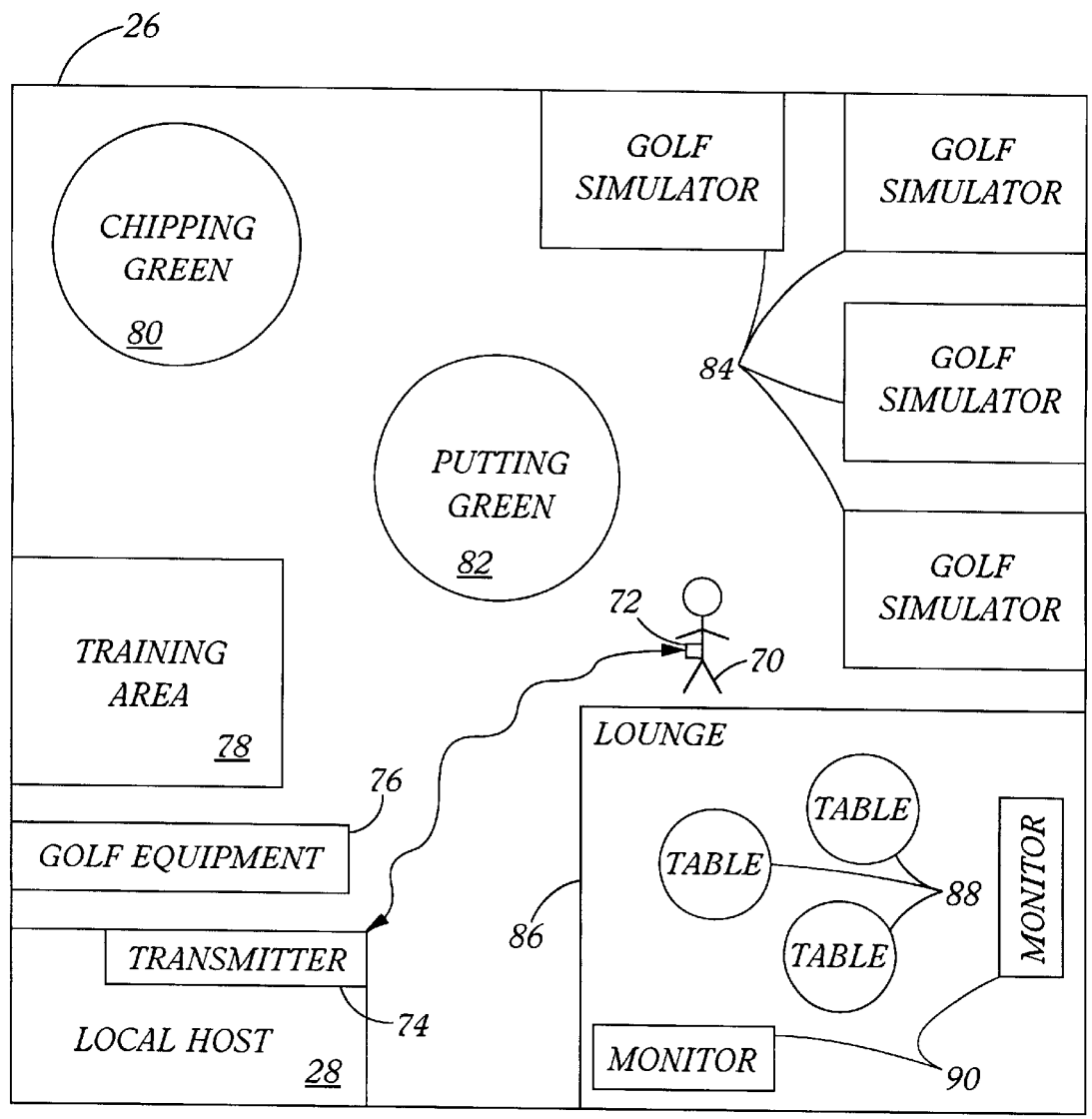
FIG. 2 is a functional schematic of an indoor golf facility of the present invention showing one preferred layout for included components.

Referring now to FIG. 2, one preferred embodiment of a golf facility 26 is illustrated. When arriving at the golf facility 26, the traveler 70 checks in at the local host 28. If the traveler 70 has a tee time or training lesson scheduled, their confirmation code is verified in a scheduling database (not shown, but located either at the local host 26 or the remote host 40) and they are given a personal receiver 72 (e.g., a pager or similar device) which is returned prior to leaving the golf facility 26. Travelers 70 without appointment or tee times can also check-in and use the facilities at the golf facility 26. The traveler 70 can instruct the local host 28 to notify them at a certain time or at a given amount of time prior to their flight (and as discussed above, the traveler 70 can provide their flight information for monitoring by the local host 28). When the notification time occurs, the local host 28 transmits an alert signal with a transmitter 74 to the personal receiver 72, at which point the traveler 70 can exit the golf facility 26 to board their flight or to meet an arriving flight (as the golf facility will be used by individuals awaiting flights not just by travelers 70). Preferably, the personal receiver 72 includes a message screen so that the alert signal from the transmitter can include flight or other information (e.g., your flight has been canceled, your departure gate has been changed, your flight departure time has changed, or you are no longer merely on standby).

Once checked-in, the traveler 70 can obtain equipment at a golf equipment area 76 at which golf equipment manufacturers preferably provide no-cost clubs and balls for travelers 70 to use while at the golf facility 26. It is believed that this free trial will be desirable for encouraging sales of equipment, and as such, an area may be provided within the golf equipment area 76 for travelers 70 to order or purchase various golf equipment. With equipment in hand, the traveler 70 can proceed to several areas to participate in golf related activities. The traveler 70 can go to the training area 78 that a golf professional will be attending or managing. The golf professional can give the traveler a golf lesson and/or can evaluate the swing of the traveler 70 with the use of various swing analysis equipment (e.g., video swing analyzers which can also provide a video for the traveler 70) and training equipment, some of which can be ordered or purchased at the golf equipment area. Alternatively, the traveler 70 can practice their short game at the chipping green 80 or at the putting green 82, which also serve as waiting and warm-up areas for the golf simulators 84.

Either through a tee time or "walking-on", the traveler 70 can play a round of golf (e.g., 9 or 18 holes) at one of the golf simulators 84. These devices are multimedia devices which project a golf course, hole-by-hole and shot-by-shot onto a screen which also serves to catch golf balls that are hit by players. Typically, four players will play at each simulator with each simulator being programmed to play/show a different course (and each simulator is typically capable of playing multiple courses). The four players will take turns playing their respective golf balls as would be done on an outdoor golf course. In this regard, travelers 70 traveling in pairs or groups can make a tee time for the number in their party to allow them to play a round of golf together at the golf facility 26. If a traveler's 70 personal receiver 72 is paged and they need to leave in the middle of a golf round, another traveler 70 can be allowed to join the foursome at that point in play (i.e., the travelers 70 on a waiting list can be notified of this play opportunity via their personal receivers 72). A traveler's 70 score at a particular course can be tracked at the traveler's 70 request for their information (which as discussed above can be accessed by the traveler via the remote host 40) or even to develop a tracked handicap as with outdoor golf.

Additionally, the golf facility 26 can optionally include a lounge area 86 comprising tables 88 and video monitors 90. In the lounge 86, the travelers 70 would be able to relax with food and drink while watching golf tournaments or other golf related television shows. The lounge 86 provides an area in the golf facility 26 for non-playing travelers 70 to enjoy their golf interests and also provides another alliance opportunity for the operator of the golf facility 26 because travelers 70 in the lounge 86 would most likely be golf enthusiasts and cable channels directed toward golf would be interested in having their programs run on the monitors 90.

Figure 3:
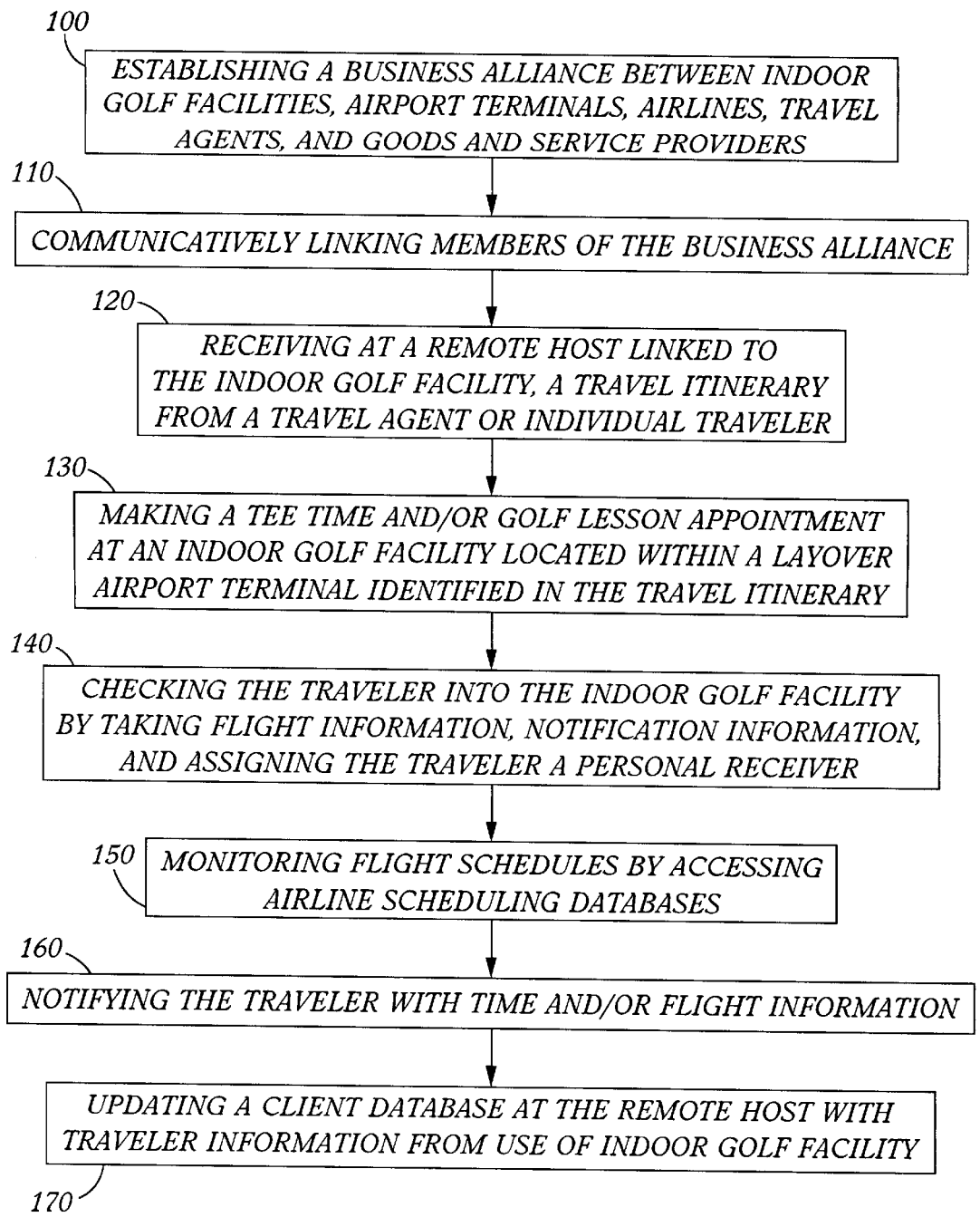
FIG. 3 is a flow chart illustrating a method of operating the indoor golf facility within an airport terminal according to the present invention.

Referring to FIG. 3, one mode of operation of a preferred management system of the present invention will now be discussed. Initially, at 100, a business alliance is formed between an indoor golf facility operator and airport terminal operators to provide space and services (e.g., communication links and storage such as lockers) for each indoor golf facility within airport terminals. The alliance is broadened to include at least one airline and travel agents such that when a travel agent makes reservations with an airline they are made aware of the availability of appointments and facilities at the indoor golf facility for their clients (i.e., travelers). The alliance with the airline preferably includes an agreement to provide the indoor golf facility with access to the airlines flight scheduling information to allow monitoring by the indoor golf facility of flight information for travelers at the indoor golf facility. The airline alliance may include activities such as the airline advertising the indoor golf facility, providing their clients with frequent flier advantages, and travel club links (e.g., members of a travel club get discounts/coupons for indoor golf facility). The alliance is further broadened to include goods and service providers that may be numerous and varied but can include outdoor golf courses, golf entertainments services (e.g., cable channels and the like), golf equipment manufacturers and retailers, hotels and other accommodations, and other businesses. At 110, all the members of the business alliance established in 100 are communicatively linked to enable exchange of information. Typically, the communications links will include Internet connections with the indoor golf facility (or its management system) having a Web site that is accessible by the alliance members. This Web site will also provide links to the other members of the alliance, for example, an individual traveler who accesses the indoor golf facility Web site will be offered links to destination, outdoor golf courses, airlines, golf equipment manufacturers and retailers, and the like. At 120, a travel agent member of the alliance forwards a travel itinerary (or request for a specific tee time or appointment time) to the indoor golf facility. It may be received at a remote host facility which can act as a central reservation facility for a number of individual indoor golf facilities. Alternatively, of course, the indoor golf facility can have larger capacity information processing on site to perform the functions typically performed by remote servers and the like.

At 130, the remote host uses the information received at 120 to make a tee time and/or a golf lesson appointment at an appropriate indoor golf facility. This will typically be an indoor golf facility located at an airport terminal where the traveler has a substantial layover (1 hour, 2 hours, or longer layover period). Additionally, the traveler can request a specific golf professional for a lesson and reserve specific golf equipment for use at the golf facility. At 140, when the traveler arrives at the airport terminal, the traveler is checked into the indoor golf facility by using their confirmation code (if applicable), by taking flight information (e.g., airline name and flight number), and notification information (i.e., do you desire notification at a particular time or at a preset time before your flight departs). The traveler is assigned a personal receiver, and the information (including the identification code for the personal receiver) is entered into a local host computer or terminal providing access to a remote computer.

At 150, the indoor golf facility monitors the flight schedules of the flight numbers provided by travelers at 140. This monitoring typically involves accessing and querying an airline's flight schedule information or database. This can be accomplished with periodic queries, such as once every 10 minutes, or with near continuous monitoring, such as less than once a minute. If the flight information is changed, for example the flight departure time is moved up 20 minutes, the traveler can be immediately notified or the notification information can be updated (i.e., to notify the traveler 20 minutes earlier). Notification occurs at 160 where the traveler is informed of the flight information. This may involve merely paging the traveler and when the traveler checks-out of the indoor golf facility any flight information updates can be provided. More preferably, the personal receiver will include a text display screen such that a message can be transmitted to the traveler informing them of any flight scheduling changes as soon as the changes are identified in the monitoring step of 150.

At 170, which typically occurs when the traveler checks-out from or leaves the indoor golf facility, a client database at the remote host computer (or located otherwise) is updated with traveler information from their most recent use of the indoor golf facility. This information can include a number of different types of golf-related information, such as courses played, scores achieved, equipment used, lesson results/professional's notes, and swing analysis information, and personal information, such as name, birth date, sex, address, income range, and other socioeconomic information. The golf-related information can then later (not shown) be accessed by the traveler via the indoor golf facility Web site for use in improving their game or planning their next trip. The golf-related information and the personal information can also be very useful, and valuable, in marketing by members of the alliance. As one example, a hotel-golf resort could use the information to contact the traveler prior to their birthday to promote a special golf/accommodation package available to the traveler on their birthday.

Clearly, the alliances mentioned above could be expanded to include numerous other goods and services providers. For example, shuttle services to hotels and to and from the airport could be included to provide a traveler with a more complete travel itinerary. The alliance could include golf professionals interested in sponsoring (i.e., having their name associated) with the indoor golf centers because of the advantages this would provide in name recognition with other goods and services they may be marketing.

Since numerous modifications and combinations of the above method and embodiments will readily occur to those skilled in the art, it is not desired to limit the invention to the exact construction and process shown and described above. For example, the present invention is specifically intended to provide a system of integrating a number of indoor golf facilities located at numerous airport terminals with the operation of numerous airlines and service providers. The above description discussed a single airport terminal for ease of understanding only. Further, it is foreseeable that golf facilities according to the invention will be used by non-travelers who are at an airport terminal to meet an arriving flight, who work at the airport, or who simply wish to use the golf facilities or to take lessons from the particular golf professional. Additionally, it is understood that numerous modifications can be made to the golf facility 26 shown in FIG. 2 to still practice the present invention, such as varying the number and locations of the facilities and services and adding or deleting services and activities provided. Accordingly, resort may be made to all suitable modifications and equivalents that fall within the scope of the invention as defined by the claims which follow, and it is to be expressly understood that such modifications and adaptations are within the spirit and scope of the present invention.

What is claimed is:

1. A method for use in operating an entertainment facility within a terminal of an airport, comprising the steps of:

providing an entertainment facility within the airport terminal, said entertainment facility being accessible to customers, wherein said customers include travelers in the airport terminal during layover periods at the airport terminal and other individuals present in the airport terminal;

establishing a communications link between a flight scheduling system of an airline operating at the airport and said entertainment facility;

at said entertainment facility, receiving from a customer flight schedule information for travel with the airline;

determining a customer notification time based on said customer flight schedule information;

monitoring at least periodically after said determining flight schedules of the airline with said customer flight schedule information by accessing the flight scheduling system through said communications link;

updating said customer flight schedule information and said customer notification time based on said monitoring; and notifying said customer at said customer notification time.

2. The method of claim 1, further including the step of storing said received customer flight schedule information and said determined customer notification time in a flight monitoring database.

3. The method of claim 2, wherein said updating step includes accessing said flight monitoring database to change said stored customer flight schedule information and customer notification time.

4. The method of claim 1, further including the step of establishing a communications link between said entertainment facility and a reservations and scheduling service and the step of making a reservation at said entertainment facility for a customer based on information received from the reservations and scheduling service over said communications link.

5. The method of claim 1, further including the step of providing the customer, who provided said customer flight schedule information in said receiving step, a personal receiver, and wherein said notifying step includes transmitting from a transmitter a notification signal to said personal receiver.

6. The method of claim 5, wherein said notification signal includes a portion of said updated customer flight schedule information, said personal receiver being adapted for displaying said portion to the customer.

7. An apparatus for use in operating an entertainment facility within an airport terminal, comprising:

an entertainment facility located within the airport terminal, said entertainment facility being accessible to customers including travelers and other individuals in the airport terminal and being configured for accepting customer reservations for use of portions of the entertainment facility; and a reservation and data storage system communicatively linked to said entertainment facility and to service providers, wherein said reservation and data storage system includes a local computer terminal at said entertainment facility communicatively linked to a remote host computer, said local computer terminal including a reservations database for storing said customer reservations and said remote host computer including a customer information database for storing information on use by the customer of said entertainment facility;

wherein, said entertainment facility is operable to accept said customer reservations from said service providers through said reservation and data storage system.

8. The apparatus of claim 7, further including customer notification means for notifying customers at a customer notification time.

9. The apparatus of claim 8, wherein said local computer terminal includes a flight monitoring database for storing customer flight schedule information and said customer notification time and wherein said local computer terminal is interconnected with a flight scheduling system of an airline operating at the airport terminal, said local computer terminal operating said customer notification means to notify customers based on said stored customer flight schedule information.

10. The apparatus of claim 9, wherein said local computer terminal is operable to at least periodically access the airline flight scheduling system and to update said customer flight schedule information and said customer notification time.

11. The apparatus of claim 8, wherein said customer notification means includes a personal receiver that can be provided to the customers and a transmitter for transmitting a notification signal to said personal receiver.

12. The apparatus of claim 11, wherein said notification signal includes at least a portion of said customer flight schedule information, said personal receiver being adapted for displaying said portion to said customer.

13. The apparatus of claim 7, wherein said entertainment facility is an indoor golf facility, said portions being selected from the group consisting of golf simulators, practice putting greens, practice chipping greens, golf-orientated lounge, and golf training centers, said golf training centers including golf professional trainers and swing analysis equipment.

14. The apparatus of claim 13, wherein said service provider being selected from the group consisting of travel agents, golf equipment manufacturers and distributers, hotels, individual customers, corporations, and destination golf courses.

15. The apparatus of claim 13, wherein said customer use information includes information selected from the group consisting of course simulation use, course scores, golf equipment preferences, training session information, and swing analysis results.

16. A method of operating an indoor golf facility within a airport terminal including at least one airline using a computer reservation and data storage system including a CPU and memory having a reservation database, comprising the steps of:

interconnecting said computer reservation and data storage system, said indoor golf facility, the airline, and at least one service provider with a communications link;

receiving with said computer reservation and data storage system a reservation request from the service provider for a customer or directly from the customer to use a portion of said indoor golf facility;

operating said computer reservation and data storage system to access said reservation database, to process said reservation request, and to make a reservation for the customer, based on said reservation request, to use said portion of said indoor golf facility;

receiving from the customer at said indoor golf facility flight schedule information for customer's travel with the airline;

determining a customer notification time based on said customer flight schedule information; and notifying the customer at said customer notification time.

17. The method of claim 16, further including the steps of monitoring flight schedules of the airline by accessing a flight scheduling system of the airline and updating said customer flight schedule information and said customer notification time based on said monitoring.

18. The method of claim 16, further including the step of providing the customer a personal receiver, and wherein said notifying step includes transmitting from a transmitting device of said computer reservation and data storage system a notification signal to said personal receiver.

19. The method of claim 18, wherein said notification signal includes a portion of said customer flight schedule information and said personal receiver includes a display for displaying said portion to the customer.

20. The method of claim 16, wherein said computer reservation and data storage system includes a local computer terminal located at said indoor golf facility communicatively linked to a host computer located remotely relative to said indoor golf facility, said local computer terminal including said reservations database for storing said customer reservations and said remote host computer including a customer information database for storing information on use by the customer of said indoor golf facility.

21. The method of claim 20, wherein said indoor golf facility, said portion being selected from the group consisting of golf simulators, practice putting greens, practice chipping greens, golf-orientated lounge, and golf training centers, said golf training centers including golf professional trainers and swing analysis equipment.

22. The method of claim 21, wherein said customer use information includes information selected from the group consisting of course simulation use, course scores, golf equipment preferences, training session information, and swing analysis results.

23. The method of claim 20, further including the step of providing access to at least one of the service providers and the customer to said customer use information stored in said customer information database.

24. The method of claim 16, wherein said communications link comprises at least one of the following: a telephone link, a satellite link, a radio-frequency link, an infrared link, an Internet link, a facsimile link, a fiber-optic link, a coaxial link, and a television link.

25. The method of claim 24, wherein said communications link includes an Internet link and said computer reservation and data storage system is adapted for accessing an Internet web site that is accessible to the service provider and the customer, said receiving step including accessing said Internet web site to retrieve said reservation request.

26. The step of claim 16, further comprising the step of interconnecting said computer reservation and data storage system to a second indoor golf facility located within a second airport terminal.

27. A system for operating an indoor golf facility within an airport terminal or concourse, comprising:

an indoor golf facility positioned within an airport concourse or an airport terminal, the airport terminal housing at least one airline;

a computer reservation and data storage system having memory for storing a reservation file; and a communications system for communicatively linking the computer reservation and data storage system, the indoor golf facility, the airline, and at least one service provider;

wherein the computer reservation and data storage system is adapted for receiving a reservation request from the service provider for a customer or directly from the customer to use a portion of the indoor golf facility, for accessing the reservation file, for processing the reservation request, for making a reservation for the customer based on the reservation request to the portion, for receiving from the customer at the indoor golf facility flight schedule information for the customer's travel with the airline, for determining a customer notification time based on the customer flight schedule information, and for notifying the customer at the customer notification time.

* * * * *